United States Patent Office 3,446,320
Patented May 27, 1969

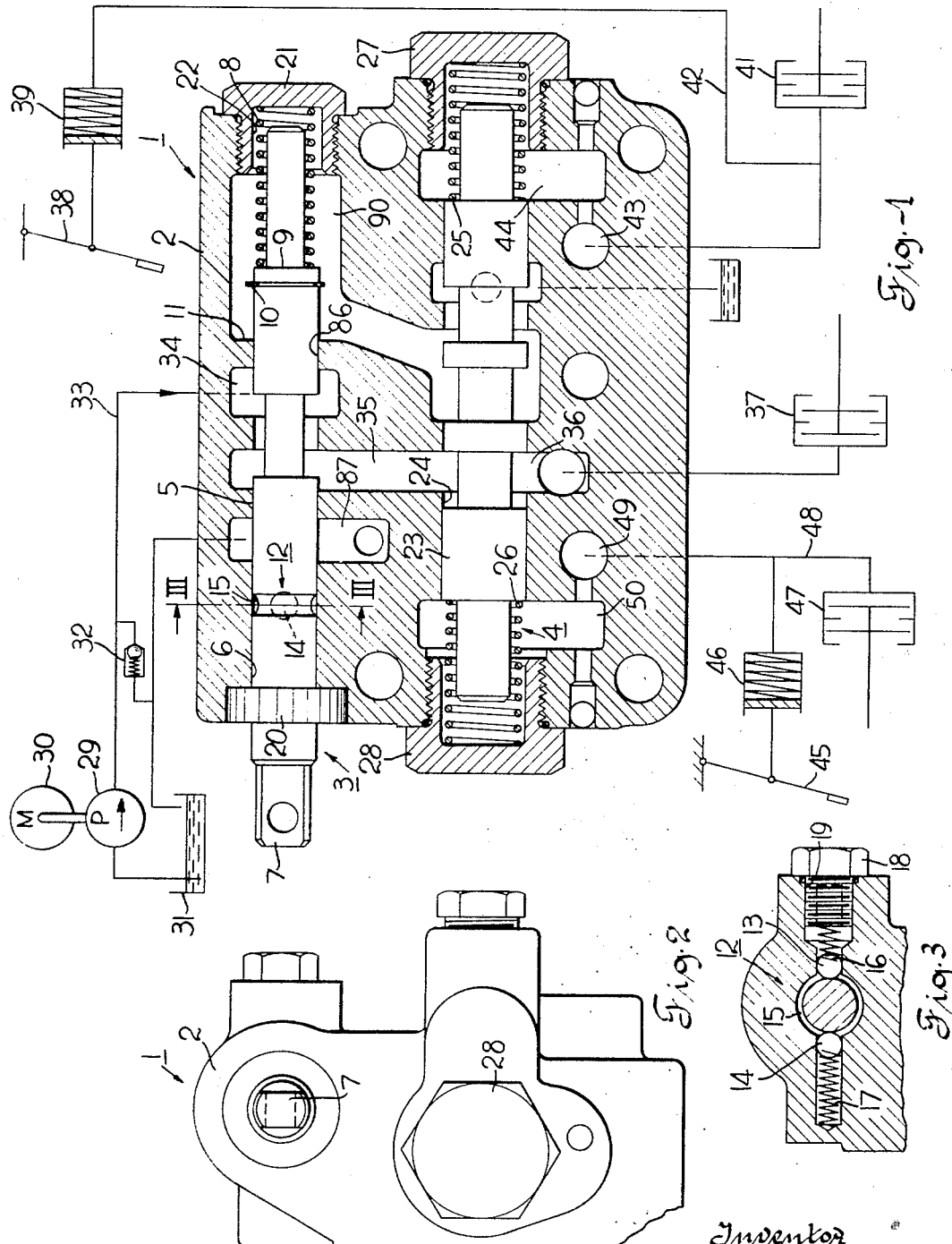

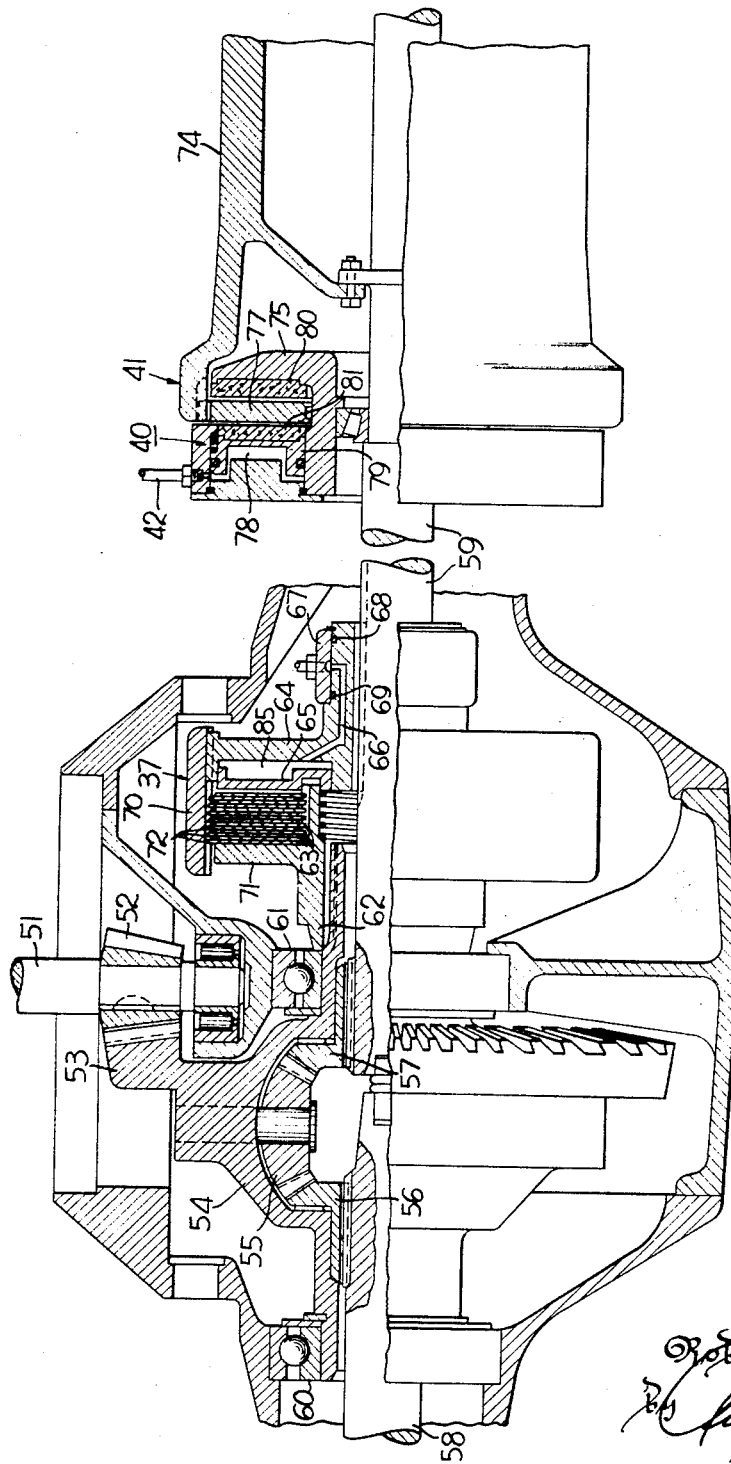

3,446,320
DIFFERENTIAL LOCK
Robert E. Schott, New Berlin, Wis., assignor to Allis-Chalmers Manufacturing Company, Milwaukee, Wis.
Filed Aug. 15, 1967, Ser. No. 660,671
Int. Cl. F16d *41/24, 67/00;* F16h *57/10*
U.S. Cl. 192—4                                                7 Claims

ABSTRACT OF THE DISCLOSURE

A hydraulically engageable clutch controlling differential rotation of the final drive shafts.

---

This invention relates to a differential and more particularly to a hydraulically, engageable clutch for controlling the differential rotation of the final drive shafts.

The conventional tractor operates through a drive train including a differential on the rear axle. A differential is required to permit one wheel to turn at a faster rate than the other wheel when the vehicle is turning. While it is necessary to provide the differential action when the vehicle is turning, it is also advantageous to lock the differential so that both the right and left hand final drive axles turn at a constant rate when the vehicle is traveling straight ahead. If the differential is locked, causing both traction wheels to turn in unison then a variable traction of the ground surface will not cause a slippage of one wheel and complete loss of the draw bar pull.

Various differential locks have been used which are releasable to permit steering of the vehicle. While it is desirable to provide a manual control to engage and release the locking of the differential it is also convenient to automatically release the differential lock when necessary during turning of the vehicle. Accordingly, this invention provides a manual control which controls the hydraulic engagement and disengagement of a clutch for locking and unlocking the differential. An automatic differential control is also provided which operates in conjunction with the braking of either the right or left hand traction wheel. The hydraulic system is used to maintain engagement of the differential lock and also provide brake actuation individually of each of the traction wheels. As one of the traction wheels is braked to assist in turning of the vehicle, simultaneously the differential is disengaged by venting the high pressure fluid which is actuating the differential clutch to a low pressure chamber such as the reservoir.

It is an object of this invention to provide a hydraulically operated clutch to control the differential rotation of the final drive shafts driving the traction wheels.

It is another object of this invention to provide a hydraulic decoupling means controlling the differential action of the differential operating in response to hydraulic actuation of a vehicle brake.

It is a further object of this invention to provide simultaneous disengagement of the differential clutch with actuation of a vehicle wheel brake.

The objects of this invention are accomplished by providing a hydraulically actuated clutch which may be controlled manually or automatically. Included in the hydraulic circuit for actuating the differential clutch, is a source of pressurized fluid, and a relay valve which is positioned in the neutral position to permit hydraulic actuation of the differential clutch when neither wheel brake is actuated. When one of the vehicle brakes is actuated, the pressurized fluid actuating the wheel brake also biases the relay valve from its neutral position to cause pressurized fluid to close the clutch control valve and sever communication between the source of pressurized fluid and the differential clutch. The pressurized fluid in the clutch actuating means is vented to a low pressure chamber and the clutch is disengaged. Accordingly, the differential and the hydraulic brakes are actuated in response to manual control of the clutch control valve or manual control of one of the hydraulic brakes.

The preferred embodiments of this invention will be described in the following paragraphs and are illustrated in the attached drawings.

FIG. 1 illustrates a schematic diagram of the hydraulic system and a cross section view of the hydraulic valves.

FIG. 2 is an end view of the hydraulic valves which includes a clutch control valve and a hydraulic relay valve.

FIG. 3 is a cross section view of the detent in the manupal clutch control valve, taken on line III—III of FIG. 1.

FIG. 4 is a fragmentary cross section view of the hydraulically actuated differential lock and the hydraulic brake for the right hand tractor wheel.

Referring to FIG. 1, the valve means 1 is shown in cross section. The housing 2, houses the manual hydraulic clutch control valve 3 and the hydraulic relay valve 4.

The spool 5 is manually actuated by a suitable lever connected to the control end 7. The spool 5 is biased to a left hand position by the spring 8 which engages the shoulder 9 on the right hand portion of the spool 5. The collar 10 limits the left hand movement of the spool 5 as it engages a radial flange 11 formed by the housing 2. The spool is retained in the position shown by the detent 12. The detent 12 is shown in the fragmentary cross section view 3 and consists essentially of a pair of spring biased ball detents including the balls 13 and 14 biased for reception within the annular recess 15 by the springs 16 and 17 respectively. The bolt 18 threadedly engages internal periphery of the bore 19 and permits the disassembly of the ball detents.

The seal 20 on the left hand end of the spool 5 seals the bore 6. The right hand end of the bore 6 threadedly receives the screw 21 having a hollow bore 22 for receiving the spring 8. The spring 8 normally biases the spool 5 to the left hand position but is not sufficient to overcome the retaining forces of the ball check springs 16 and 17 when the balls 13 and 14 are in the annular recess 15.

The relay valve 4 includes a spool 23 received within the bore 24 of the housing 2. The spool 23 is resiliently biased to a neutral position by a pair of springs 25 and 26. The cap screws 27 and 28 receive the springs 25 and 26 respectively which maintain a neutral position of the spool 23.

The hydraulic system includes a pump 29 driven by a motor 30. The pump is hydraulically connected to the fluid body in the reservoir 31, and pumps hydraulic fluid into conduit 33. The conduit 33 is in communication with the chamber 34, passage 35 and the bore 6. The chamber 36 is connected to the passage 35 and also is in communication with the hydraulically actuated clutch 37. When the relay valve 4 is in its neutral position, pressurized fluid pumped from the pump 29 actuates the differential clutch 37.

The right hand brake lever 38 pressurizes fluid in the master cylinder 39 which in turn actuates the wheel cylinder 40 as shown in FIG. 4 and the right hand wheel brake 41. The conduit 42 intermediate the master cylinder 39 and the wheel cylinder 40 is also in communication with the passage means 43 and chamber 44. The left hand brake lever 45 operates the left hand master cylinder 46 which is in communication with actuating means for the left hand brake 47. The conduit 48 is in communication with the passage 49 and chamber 50. The relay valve 4 is actuated in response to actuation of either the right hand or left hand wheel brake.

Referring to FIG. 4, the transmission drive shaft 51 drives the transmission pinion gear 52. The pinion gear 52 meshes with the ring gear 53 which is intergral with the differential cage 54. The differential cage 54 carries the differential bevel gear 55 and the left hand drive gear 56 as well as the right hand drive gear 57. The differential cage 54 rotates on a common axis with the left final drive shaft 58 and the right hand final drive shaft 59. The differential cage 54 is rotatably supported by the bearing assemblies 60 and 61. The left hand drive gear 56 is spline coupled to the left hand drive shaft 58. The right hand final drive shaft 59 is spline connected to the right final drive gear 57. The differential bevel gear 55 engages gears 56 and 57 and is mounted normally to the final drive gears 56 and 57.

The differential cage 54 is spline connected to the clutch sleeve 62 which in turn is spline connected to the plurality of clutch discs 63. The right hand final drive shaft 59 is also spline connected to the clutch cylinder 64 which receives the clutch piston 65. The conduit 33 is in communication with the inlet passage 66 in the clutch cylinder 64. The bushing 67 and seals 68 and 69 form a seal around the right hand portion of the clutch cylinder 64 sealing the inlet passage 66. A retainer sleeve 70 extends peripherially about the clutch cylinder and piston 64. The differential cage 54 is spline connected to the clutch sleeve 62 forming backup plate 71 which is also received within the retainer sleeve 70 which is spline connected to the plurality of clutch discs 72.

Accordingly, when the clutch 37 is actuated the differential cage 54 and the right hand drive gear 57 are locked to cause the right hand final drive shaft 59 and the left hand final drive shaft 58 to rotate in unison about a common axial center.

The fragmentary cross section in the right hand portion of FIG. 4 shows a portion of the wheel assembly 74 which is intergral with the right hand traction wheels. The shaft 59 is broken away intermediate the cross section portion showing the clutch 37 and the brake 41. The brake backup plate 75 and the wheel cylinder 76 form a caliper type brake for engaging a rotating disc 77 connected to the wheel 74. The cylinder 40 forms a pressure chamber 78 with the wheel piston 79. The chamber 78 is in communication with the master cylinder 39 through the conduit 42. The pressurization of fluid in the chamber 78 causes the wheel piston 79 to move in the right hand direction within the wheel cylinder 40 and causes the stationary discs 80 and 81 to frictionally engage the rotating disc 77.

The operation of the differential clutch and the wheel brakes will be described in the following paragraphs.

The pump 29 pumps fluid from reservoir 31 into conduit 33 which has a relief valve 32 connected by a return passage to reservoir 31. Pressurized fluid passes into the chamber 34, passage 35, and chamber 36 to pressurized fluid in the chamber 85 defined by the clutch piston 65 and clutch cylinder 64. The clutch piston 65 moves axially to cause the discs 72 and 63 to frictionally engage each other and to maintain a nonrotative relationship between the differential cage 54 and the right hand final drive shaft 59. This causes the output drive shafts 58 and 59 to rotate at the same rate when power is transmitted from the transmission through the transmission pinion 52 driving the differential ring gear 53. The differential is locked for maximum traction under adverse conditions. The clutch control valve 3 is shown in the position for locking the differential. The spool 5 may be moved to the left hand position manually. The spring 8 will maintain the spool in a left hand position causing the land 86 to close the portion of the bore 6 intermediate the chamber 34 and the passage 35 and opening the bore intermediate the chamber 34 and the passage 35 thereby venting the clutch cylinder chamber 85 to the reservoir 31 and disengaging the differential clutch 37.

The same action may be initiated by actuation of either the right or left hand wheel brake. The direction of movement of the relay valve 4 will depend on which brake is actuated. When the operator of the vehicle turns the front wheels of the vehicle sharply, the steering may be assisted by also braking the traction wheel on the side in the direction in which the vehicle is being steered. When the vehicle brake lever 38 is depressed, fluid is pressurized within the master cylinder 39 causing the pressurization in the chamber 78 and the actuation of the right hand brake. The pressurized fluid in the conduit 42 is also in communication with the chamber 43 and transmits hydraulic fluid into the chamber 44. Pressurized fluid in the chamber 44 biases the spool 23 in a left hand direction permitting pressurized fluid from passage 35 to enter the spring chamber 90. The pressurized fluid in the chamber 90 and the spring 8 cause the spool to move to a left hand position blocking communication between the chamber 34 and passage 35. A further left hand movement permits pressurized fluid in passage 35 to be vented to chamber 87 and the reservoir 31. This in turn deenergizes the differential clutch 37. The springs 8 will maintain the spool 5 in the left hand position and maintain the clutch in a disengaged position. The spool 5 must be moved manually to the right to engage the clutch by placing communication between the pump 29 and the chamber 85 formed by the clutch cylinder 64 and piston 65.

If the left hand brake 47 is actuated, the same result is accomplished and the clutch 37 is disengaged. The operation is slightly different in that the spool 23 will move to the right hand position in response to the biasing force of spring 26 and pressurized fluid in the chamber 50. The spool 5 moves to the left hand position and blocks communication from the pump 29 to the clutch 37. The actuation of the brake automatically deenergizes the differential clutch to permit the differential action for turning of the vehicle and permits one of the traction wheels to rotate at a different rate relative to the other traction wheel.

The embodiments of the invention in which an exclusive property or privilege is claimed are defined as follows:

1. In a vehicle having hydraulic brakes and a differential drive means between the transmission and the two final drive shafts, a hydraulic system including a source of pressurized fluid, a hydraulically actuated clutch locking said differential drive means for synchronously rotating said final drive shafts, a hydraulic control valve means having hydraulic actuating means controlling the flow of pressurized fluid from said source of pressurized fluid to said hydraulically actuated clutch, a hydraulic brake system having a brake for braking each of said final drive shafts, a hydraulic relay valve means in said hydraulic system including actuating means hydraulically in communication with said hydraulic brakes for operating said relay valve means, said relay valve means directing the flow of pressurized fluid to said hydraulic actuating means on said control valve to close said control valve and thereby deenergize said clutch in response to actuation of one of said hydraulic brakes.

2. A hydraulic system as set forth in claim 1 wherein said control valve means may be actuated manually for controlling the operation of said differential drive means by selectively engaging and disengaging said clutch.

3. A clutch control valve means as set forth in claim 1 wherein said control valve means is manually positioned for actuation of said clutch and automatically disengaged in response to actuation of at least one of said hydraulic brakes.

4. A hydraulic system as set forth in claim 1 wherein said relay valve means is normally biased to a neutral position and hydraulically biased to a position causing said control valve means to block communication between said source of pressurized fluid and said clutch to thereby deenergize said clutch when one of said vehicle brakes is actuated.

5. A hydraulic system as set forth in claim 1 wherein said relay valve means is normally spring biased to a neutral position for permitting actuation of said clutch and fluid biased to a position causing pressurized fluid from said source of pressurized fluid to bias said control valve means to a closed position to block the communication between said source of pressurized fluid and said clutch to thereby disengage said clutch when one of said hydraulic brakes is actuated.

6. A hydraulic system as set forth in claim 1 wherein said control valve means is normally retained in a position causing said clutch to lock said differential drive means and hydraulically biased to a position to cause said clutch to disengage and thereby permit the differential operation of said differential gear means when one of said brakes is actuated.

7. A hydraulic system as set forth in claim 1 wherein said system includes a low pressure reservoir, said relay valve means has hydraulic actuating means to bias said relay valve to a position permitting pressurized fluid from said source to bias said control valve means to a position blocking communication from said source to said clutch and providing communication between said clutch and said low pressure reservoir to thereby permit differential action of said differential drive means when one of said hydraulic brakes is actuated.

References Cited

UNITED STATES PATENTS

| | | | |
|---|---|---|---|
| 3,050,165 | 8/1962 | Day et al. | 192—4 X |
| 3,313,383 | 4/1967 | Tehoresse | 192—4 |
| 3,301,359 | 1/1967 | Cole et al. | 192—4 |
| 2,340,134 | 1/1944 | Maxon et al. | 180—6.24 |
| 2,630,869 | 3/1953 | Armington | 180—6.24 |
| 2,830,670 | 4/1958 | Ferguson | 180—75 |
| 2,965,181 | 12/1960 | Senkowski | 74—710.5 X |
| 3,292,720 | 12/1966 | Harvey | 180—6.2 |

ARTHUR T. McKEON, *Primary Examiner.*

U.S. Cl. X.R.

74—710.5